United States Patent [19]

West, Jr.

[11] 4,165,704
[45] Aug. 28, 1979

[54] SELF STEERING DEVICE FOR SEA CRAFT

[75] Inventor: Francis West, Jr., Vineyard Haven, Mass.

[73] Assignee: Robert S. Sanborn, Vineyard Haven, Mass. ; a part interest

[21] Appl. No.: 900,510

[22] Filed: Apr. 27, 1978

[51] Int. Cl.² .............................................. B63H 25/52
[52] U.S. Cl. ................................................ 114/144 C
[58] Field of Search ........... 114/144 C, 144 E, 144 R; 73/186–189; 244/82; 318/588

[56] References Cited

U.S. PATENT DOCUMENTS

| | | | |
|---|---|---|---|
| 3,319,594 | 5/1967 | Gianoli | 114/144 C |
| 3,678,878 | 7/1972 | Ross-Clunis | 114/144 C |

*Primary Examiner*—Jesus D. Sotelo
*Attorney, Agent, or Firm*—Robert S. Sanborn

[57] ABSTRACT

This is an apparatus to provide automatic self-steering for seacraft, particularly high speed sailing craft of the multi-hull type such as catamarans and trimarans which tend to respond instantly to small shifts in rudder angle. It includes a wind vane, many types of which are well known, which can be pre-set to respond to the direction of the apparent wind encountered by the craft while sailing on a pre-selected compass course to control a rudder and a damping mechanism or course stabilizer which is responsive to any temporary attempt of the craft to turn in either direction away from the desired and pre-selected compass course by either opposing the action of the wind vane as the wind vane responds to a temporary shift in apparent wind direction and tries to turn the craft away from the pre-selected course or, if the craft is turned off course as by wave action, acting to help the wind vane turn the rudder so as to bring the craft back onto the pre-selected compass course.

Each of two embodiments of the damping mechanism or course stabilizer includes a drogue which is towed behind the craft. When the craft is turned off its course the drogue exerts a turning force upon the rudder, either resisting or helping the force exerted by the wind vane on the rudder.

In a first embodiment, both the wind vane and the drogue are connected to the rudder by a mechanical linkage. In a second embodiment the wind vane and the drogue are connected to operate the rudder by electric and electronic means in combination with a mechanical linkage.

In a third embodiment a rate gyroscope responsive to the rate of turn of the craft away from a pre-selected course is substituted for the drogue in the second embodiment.

15 Claims, 5 Drawing Figures

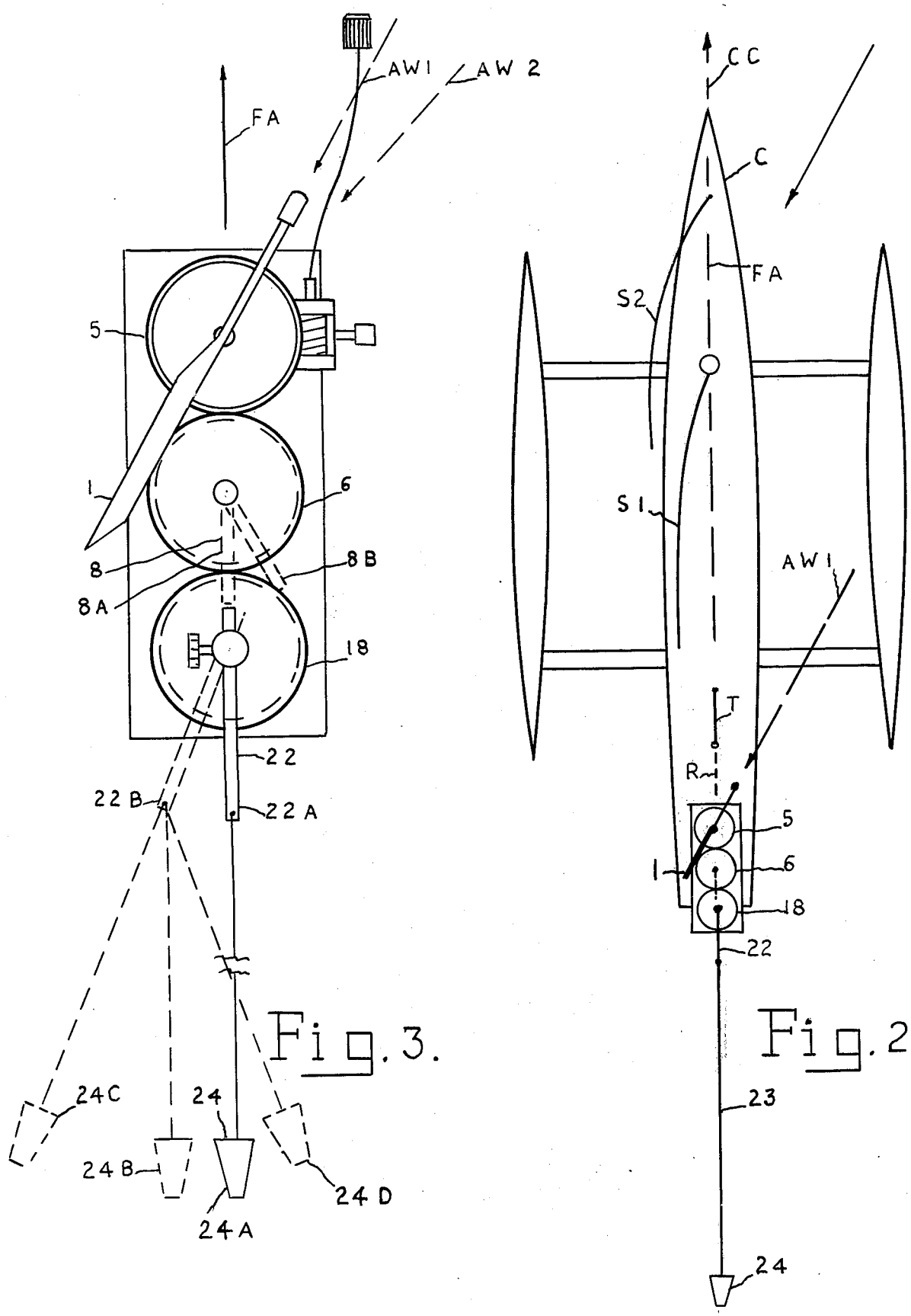

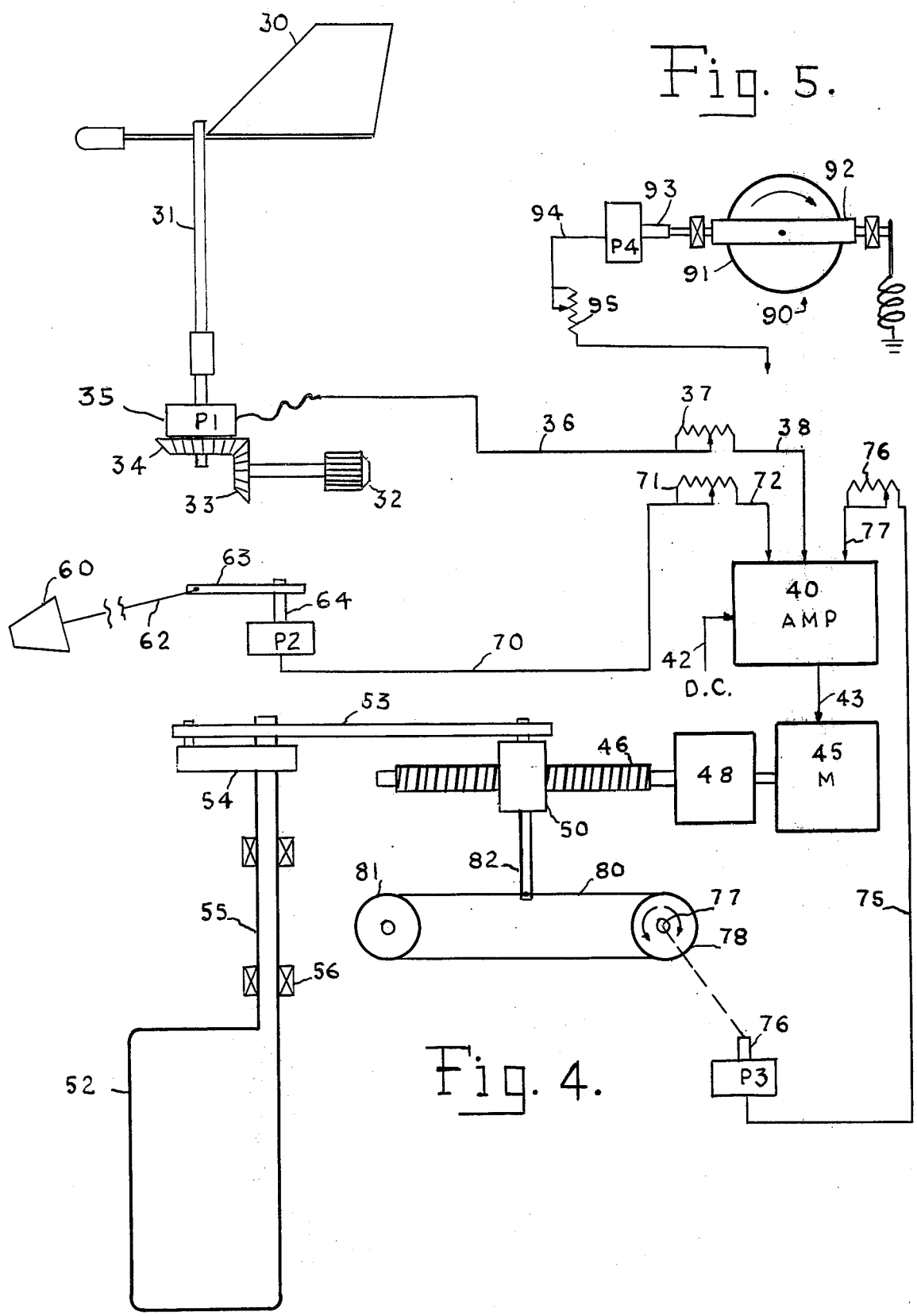

SELF STEERING DEVICE FOR SEA CRAFT

BACKGROUND OF THE INVENTION

Wind vane steering control of sailing craft is well known and has been used for many years particularly on sailing yachts of the historically conventional type, that is, of the single hull or mono-hull type. It appears that wind vane steering was first employed to any great extent on sailing models. In more recent years, such steering control has been adapted to full size sailing craft, mostly yachts in the range of size between twenty and one hundred feet in overall length, particularly those sailed "short-handed." There are many different types of wind vane steering devices, but they all have the common function of steering the craft on a preselected compass course by responding to the direction of the apparent wind encountered by the craft on such course and transmitting such response to an underwater steering rudder, either the craft's own rudder or an auxiliary rudder provided for the purpose.

The apparent wind is the wind which is sensed by a sail or power craft as it moves through the water. Its velocity and direction are the resultants of the forces created by the velocity and direction of the true wind and by the direction and speed of movement of the craft through the water. For instance, a speedboat moving at sixty knots in a five knot true wind from one side senses an apparent wind from almost dead ahead. Fast sailing ice boats encounter similar apparent winds. Under ideal conditions the direction and velocity of the true wind will remain steady and the direction and speed of the craft's hull through the water will also remain steady so that the craft will encounter an apparent wind which is also steady in direction and velocity.

However conditions at sea are never constant. A sailing hull is subjected to variations in velocity of the true wind which in turn create variations in relative direction and velocity of the apparent wind. Generally speaking, an increase in the velocity of the true wind will cause the direction from which the apparent wind is coming to draw aft because the forward component due to the craft's movement is comparatively reduced. That is, the angle of the direction from which the apparent wind is coming relative to the ship's heading will increase. Conversely, a drop in the velocity of the true wind will cause the apparent wind to draw ahead or forward thus decreasing the angle of its direction relative to the craft's heading.

A change in the speed of the craft through the water also changes the angle of the apparent wind in that an increase in the speed of the hull through the water will tend to make the apparent wind draw ahead and a decrease in speed will cause it to draw aft or back. However a conventional sailing craft rarely exceeds a speed of ten knots and most sailing yachts usually sail below a speed of seven or eight knots in average conditions so that they encounter very few changes in apparent wind direction due to changes in hull velocity. Consequently the changes in apparent wind direction they encounter are caused almost entirely by changes in true wind velocity or direction or because the craft has been thrown off its course due to wave action.

Vane type steering devices work satisfactorily on conventional mono-hull sailing craft because such vessels are generally slow to respond to minute rudder changes caused by momentary changes in wind velocity or wave action. Thus, relatively speaking, the somewhat inert turning reaction of the hull creates a damping action which tends to resist what would otherwise be rapid and erratic course changes due to variations in the velocity of the wind and wave action.

It will be understood that with a relatively heavy mono-hull craft, acceleration and deceleration are relatively low and do not produce rapid changes in apparent wind direction. It will also be understood that a change in true wind direction unless relatively temporary will require re-setting the wind vane.

Recent experience with high speed multi-hull sailing craft has shown that the use of a wind vane alone for steering control is highly unsatisfactory under some conditions.

Such multi-hull craft are capable of achieving relatively very high speeds which are of the order of ten to thirty knots as opposed to the below ten knot speeds of conventional mono-hull vessels. Multi-hull craft are very light in weight compared to conventional craft. When they encounter a puff of wind, that is, a sudden increase in true wind velocity, they are capable of high acceleration, say from five to eighteen knots in a very short time and, conversely, of high deceleration when the wind drops, creating a variation in apparent wind angle due to changes of hull speed through the water not ordinarily encountered by conventional craft.

Such light weight craft are much more sensitive to small rudder changes due to their inherent light weight and because there is very little of any of the hulls of the craft below the surface of the water to resist turning influences such as are encountered with conventional sailing craft. The result is that, particularly when sailing at high speeds in strong winds, wind vane steering control alone produces very rapid and erratic course changes. This is because inherently there is very little damping effect exerted by a high speed sailing hull as compared to that exerted by a slower turning less responsive mono-hull acting to reduce erratic course changes. Otherwise stated, a relatively slow moving sailing hull requires much more rudder angle and a longer time to cause it to turn than a high speed, light weight sailing hull which requires very little rudder angle to cause radical course changes.

Something additional is required in conjunction with a wind vane steering control to dampen and stabilize high speed sailing craft against such erratic course changes as result when a wind vane is used alone.

The apparatus of my invention provides such a stabilizing and damping effect and "irons out" rapid momentary undesired course changes with the result that a wind vane steering control in combination with my apparatus will operate satisfactorily as a steering control when applied in high speed sailing craft.

SUMMARY OF THE INVENTION

One form of the apparatus of my invention includes a wind vane preferably mounted at the stern of the vessel near the rudder, a mechanical linkage to connect the wind vane to the rudder such as gears or other linkages whereby a turning force exerted on the wind vane by the apparent wind will exert a turning force on the rudder, and a drogue to be towed astern of the vessel and connected through another mechanical linkage such as a lever and a gear so as also to impart a turning force on the rudder. If the relative angle of the wind vane changes due to a sudden change in the apparent wind direction and the craft course starts to change, the drogue will then exert a turning force on a lever and hence on the rudder opposite to that exerted by the wind vane and will thus resist and damp the turning action of the wind vane and tend to stabilize the heading of the craft by preventing it from taking such a radical turn as would otherwise be affected by the action of the wind vane if not resisted by the force of the drogue. When, however, the craft is thrown off course in either direction by wave action a change in relative direction of the apparent wind will not only cause the wind vane to exert a turning action on the rudder to bring the craft back onto its correct course but also the change in the relative angle of the drogue from dead astern to an angle to one side with respect to the fore and aft line of the craft will cause a turning force on the rudder which is separate from and in aid of and in addition to the turning force exerted by the wind vane on the rudder to put the craft back on course under such a condition. In this case the drogue acts as a course stabilizer in aid of the wind vane rather than to damp the action of the wind vane.

Such apparatus includes means to pre-set the angle of the wind vane relative to the fore and aft line of the craft and to the rudder angle and also means to adjust the force exerted by the drogue relative to that exerted by the wind vane. More radical adjustments as between the forces exerted between the wind vane and the drogue may be made to suit the hydrodynamics of the particular hull by changes in the gear ratios or leverages in the mechanical linkages to the rudder.

Another form of the invention embodies electrical and electronic linkages between the wind vane and the drogue respectively on the one hand and the rudder on the other in addition to mechanical linkage, with appropriate adjustments provided between the separate forces exerted by the wind vane and the drogue.

A still further form of the invention embodies the use of a rate gyro in place of the drogue and which responds to the rate of turn of the craft rather than the angular displacement of the turn to impart a signal which has the effect of resisting or else aiding the action of the wind vane as the circumstance requires.

DESCRIPTION OF THE DRAWINGS

FIG. 2 is a general top plan view of a trimaran sailing craft embodying the self-steering control of the invention shown in FIG. 1.

FIG. 3 is an enlarged partial view of FIG. 2 showing a plan view of the apparatus of FIG. 1 with some of the parts omitted.

FIG. 4 is a partially schematic side elevation view of a second embodiment of the invention including electrical and electronic control and actuating mechanism.

FIG. 5 is a schematic view of a rate gyro which may be substituted for the drogue and associated mechanism in FIG. 2 as the damping and stabilizing means.

DETAILED DESCRIPTION OF THE INVENTION

Figure 1:
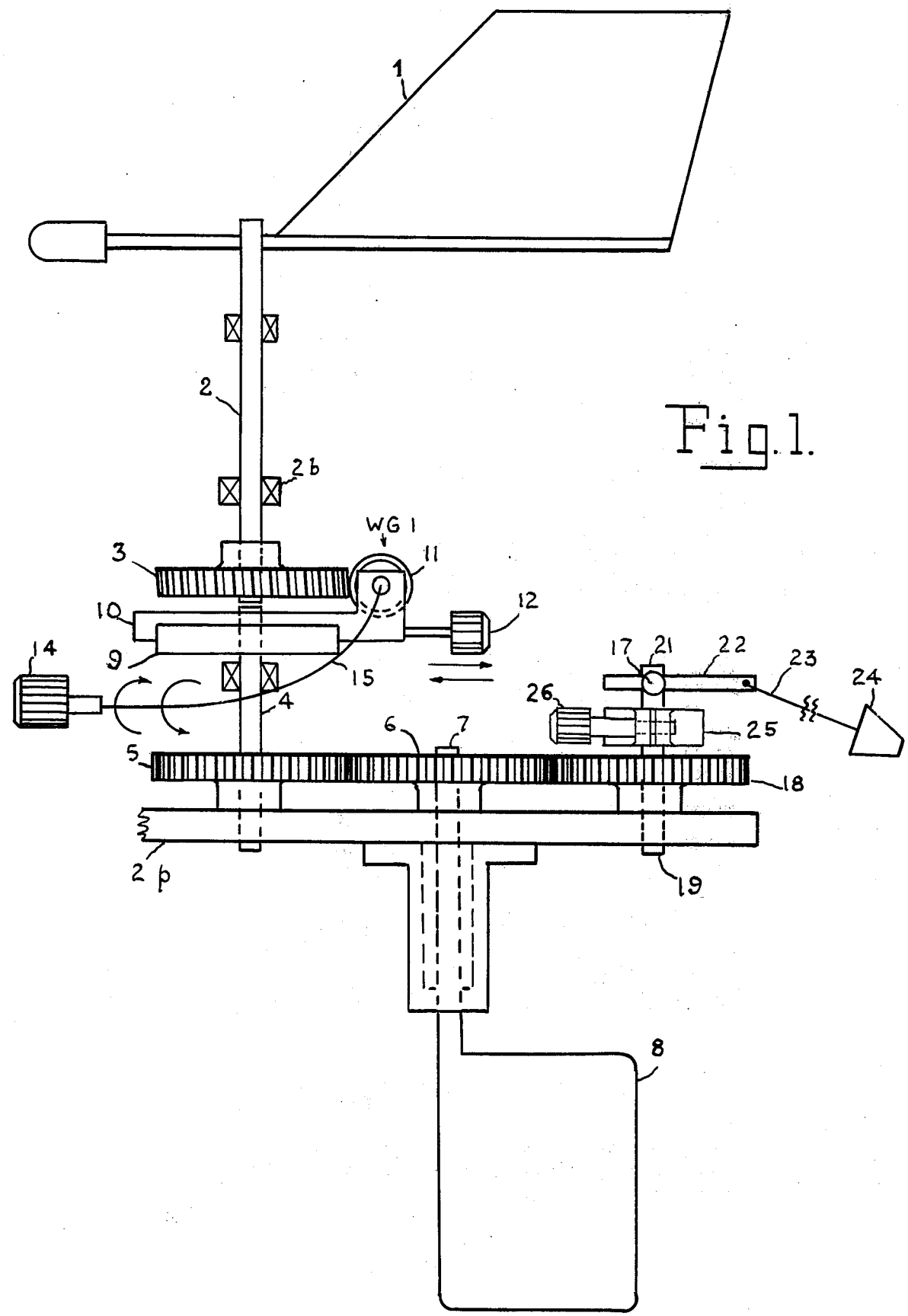
FIG. 1 is a partially schematic side elevation view of an entirely mechanical form of the apparatus of the invention.

A first embodiment is seen in FIGS. 1 to 3. It includes a conventional wind vane 1 fixed on a vertical shaft 2 mounted on or near the stern of the craft C as for instance in bearings 2b and on a platform or deck 2p so that the vane 1 and shaft 2 may pivot vertically relative to the fore and aft line FA of the sailing craft C upon which it is mounted so as to be directionally responsive to the apparent wind indicated by AW 1 in FIG. 3.

Affixed to the shaft 2 is a worm gear 3. Coaxially arranged below the shaft 2 but separate from it is another shaft 4 having fixed to it a spur gear 5 which engages a spur gear 6 fixed to the shaft 7 of an auxiliary rudder 8.

The shaft 2 is arranged to be engaged to and disengaged from the shaft 4 in any relative rotative position between the two by a worm and worm gear arrangement indicated at WG 1. The shaft 4 has fixed on it so as to turn with it a slideway 9. Slideably mounted in the slideway 9 is a slide block 10. Rotatably mounted on the slide block 10 is a worm 11 which can be engaged to and disengaged from the gear 3 by moving the slide block 10 in and out in the slideway 9 toward and away from the axis of the two shafts 2 and 4 as by manually pulling a knob 12. In this manner the rotative position of the wind vane 1 and the shaft 2 may be established relative to the rotative position of the shaft 4, the gears 5 and 6 and the rudder 8. Fine adjustment of these relative positions may be further established by manually turning a remote control knob 14 on a flexible shaft 15 fixed to the worm 11 so as to turn the worm to rotate the gear 3 and the shaft 2 slightly relative to the shaft 4 and rudder 8 in the manner of a vernier control.

Meshing with the gear 6 is a gear 18 fixed on a vertical shaft 19 which is rotatably mounted on the platform or deck 2p attached to the craft.

Above and in line with the shaft 19 is another shaft 21 releasably connected to the shaft 19 through a friction clutch arrangement indicated at 25 which is controlled by a knob 26.

A lever arm 22 is slideably adjustable in and out on the shaft 21 with respect to its axis, held in position as by a set screw 17 and normally pointing straight aft or astern and in line with the rudder 8 but in some cases at an angle when the rudder is in or near an amidships position, i.e., with respect to the fore and aft line FA of the craft. Attached to the aftermost end of the lever arm 22 by a relatively long flexible line 23 is a drogue 24 so shaped as to create a drag when towed through the water. The length of the flexible line 23 may be of the order of fifteen to fifty feet more or less, depending upon the characteristics of the craft with which it is associated.

In the operation of the embodiment in FIGS. 1 through 3 inclusive and particularly referring to FIG. 1, to set a course using the apparatus of the invention, the craft C is first put onto the desired compass course cc by the use, for instance, of a manually operated rudder which could be arranged to be the rudder 8 of the apparatus shown in FIG. 1 or a separate manually operated rudder R moved by a tiller T as shown in FIG. 2. When the craft C is on the pre-selected compass course indicated by cc, its fore and aft line indicated by FA will correspond to the course cc. At this point the sails indicated by S 1 and S 2 are trimmed to accommodate to the apparent wind, the assumed direction of which is indicated by AW 1.

The worm 11 has been disengaged from the worm gear 3 by pulling out the knob 12, allowing the vane 1 to swing freely into the apparent wind and allowing itself to be aligned in the direction indicated by AW 1 in FIGS. 2 and 3 which is the direction of the apparent wind in the first instance. At this point the rudder 8 is amidships or nearly so, depending on the "amount of rudder" or rudder angle necessary to hold the course cc, that is to say, on or near the fore and aft line FA of the craft C and the pre-selected compass course cc. The wind vane 1 is now engaged to the rudder by pushing in on the knob 12.

The lever arm 22 and drogue line 23 are also on or parallel to the fore and aft line FA and the course line cc, that is, straight aft, but may be adjusted so they and the drogue are allowed to assume an angle to the fore and aft line FA and also to the rudder 8 by disengaging and then engaging the friction clutch 25. While the drogue 24 is being towed through the water it normally lies in a direction straight aft but, in some cases, it may want to be towed off at an angle to accommodate drift or sidewise motion of the craft C.

As was mentioned, when the craft is put on course, the rudder 8 may not be amidships or on the fore and aft line FA, because some rudder angle right or left, as the case may be, may be required to hold the craft on course, for instance to compensate for "weather helm" when the wind pressure on the sails tends to turn the craft off course. In this case the wind vane 1 may have to be adjusted so that the wind blows harder on one side of it in order to hold the necessary rudder angle. For this purpose among others a fine adjustment of the rotative position of the wind vane 1 relative to the rudder 8 may be made by turning the knob 14 which turns the worm 11 providing a fine rotative adjustment between the gears 3 and 5.

Assume, for simplicity that the steering gear and its components are in balance with the wind vane 1 heading straight into the apparent wind AW 1 with the rudder amidships and with the lever arm 22 and drogue 24 disposed straight aft. As long as the apparent wind remains as coming from its initial relative direction indicated by AW 1 and no wave action throws the craft C off its course, the craft will continue along its pre-selected compass course cc.

Referring now particularly to FIG. 3 let us now assume that a temporary increase in the velocity of the wind causes the apparent wind to draw aft, that is to have its direction shift clockwise to a relative direction from that indicated by AW 2. This will cause the vane 1 to try to turn in a clockwise relative direction to align itself with the wind direction AW 2 and hence the gear 5 will also try to turn in a clockwise direction thus causing the gear 6 to try to turn in a counter clockwise direction causing the rudder 8 to try to shift from its amidships position indicated by 8 A to a right rudder position indicated by 8 B. Some rudder shift will occur. This shift in the rudder angle will cause the craft C to start to turn to the right. With a fast sailing craft such as a trimaran indicated by C in FIG. 2 sailing in a strong wind with very little of any of its three hulls in the water, the turning response is almost instantaneous and, without the improved apparatus of the invention, would not only be undesirably too great but would continue to occur in too great an amplitude in response to momentary increases and decreases of the wind resulting in a very serpentine and erratic course being followed by the craft.

It will be seen however that when the gear 6 and rudder 8 start to turn in a counter-clockwise direction the gear 18 and lever 22 start to turn in a clockwise direction. Some turning will occur, as from the amidships position indicated by 22 A into the position indicated by 22 B. For a delayed period of time the drogue 24 tends to remain in a direction straight astern merely shifting from the position indicated by 24 A to the position indicated by 24 B. Thus the drogue 24 exerts a pull on the lever 22 trying to turn it back in a counter clockwise direction or in other words resisting the turning force exerted by the clockwise turning effort of the wind vane 1. Therefore the drogue exerts a counter force and a damping effect on the turning action of the wind vane in instances of temporary changes in apparent wind direction. If the craft turns the effect is increased.

If the apparent wind draws ahead or counterclockwise with respect to the direction indicated by AW 1 the wind vane will try to turn the gear 5 counterclockwise, the gear 6 and rudder 8 clockwise, the gear 18 and the lever 22 counterclockwise and the pull of the drogue on the lever will resist the counterclockwise turning of the lever 22 and therefore the turning action of the rudder 8 in the other direction.

Thus far there has been described a damping effect exerted by the drogue in opposition to the turning effect of the wind vane 1 due to changes in the apparent wind direction while the craft C was otherwise tending to remain on its pre-selected compass course cc.

In another set of circumstances the apparent wind direction AW 1 may change, not as the result of changes in true wind velocity or high acceleration and deceleration of a fast moving multi-hull sailing vessel, but will change because the craft C itself is thrown off its pre-selected course by wave action.

Again looking at FIG. 3 it will be seen that if the craft C is thrown by a wave to the left of its course cc this can also cause the apparent wind to draw aft or clockwise from a relative direction AW 1 to a relative direction AW 2 causing the wind vane 1 again to turn clockwise and the rudder to turn from position 8 A to position 8 B to bring the craft C to the right and back onto its course cc. Such a turn to the left will again bring the lever 22 from position 22 A to position 22 B. But since the craft itself was caused to turn off course to the left the drogue 24 will immediately shift to the left to the position indicated by 24 C thus aiding the turning of the lever 22 in a clockwise direction and the rudder in its turn into position 8 B. In this case therefore the drogue 24 acts as a course stabilizer in that as soon as the craft is thrown off course to the left the drogue 24 shifts to the position 24 C even before the rudder angle may have time to change because of resistance against rudder changes due to high speed of the craft through the water. The drogue pulls on the lever 22 helping it to shift from the position 22 A to the position 22 B thus adding a force to turn the rudder 8. This is particularly helpful when sailing down wind when heavy seas cause the craft to slew far off course.

The drogue 24 and its associated apparatus thus acts as a damping means to resist undesired changes in the craft's heading away from the pre-selected course due to apparent wind shifts and as a stabilizing means to help bring the craft back onto course when it has been thrown off in either direction by wave forces.

It must be understood that a craft sailing at high speed in ocean wave conditions is continuously being subjected to rapidly varying and strong forces such as increases and decreases in wind velocity, high hull acceleration and deceleration and quick wave action and with quick hull responses the likes of which only this type craft is capable. Such rapid and radical changes and variations in forces result in extremely unsatisfactory performance by steering devices actuated by wind vanes alone and in many conditions the vessel has to be continually manually steered because of such unsatisfactory steering performance.

The apparatus of this invention irons out such radical performance variations and results in satisfactory course keeping under virtually all conditions encountered by fast moving light weight sailing craft.

In this first embodiment of FIGS. 1 to 3 the drogue has a peculiar advantage in that its drag increases as the craft's speed increases thus providing increased force in opposition to or in aid of the turning of the rudder as required. The increased opposing force is required because the craft's increase in speed will be caused by an increase in wind and therefore of turning force on the wind vane. The increased force in aid of turning is required because increased hull speed requires more force to turn the rudder. Such advantage offsets the slight reduction in speed due to drag from the drogue.

Also this first embodiment has the advantage of simplicity in that its working parts are all mechanical and are therefore capable of easy maintenance and repair in a corrosive salt water environment.

A second embodiment of the invention is seen in FIG. 4. A wind vane 30 is fixed on a shaft 31 and the shaft 31 is connected to the wiper (not shown) of a potentiometer P1. The body 35 of the potentiometer P1 may be rotatively adjusted with respect to its wiper, the shaft 31 and wind vane 30 by manually turning a hand knob 32 connected to the body 31 through bevel gears 33 and 34. When the wind vane 30 is responding to the apparent wind after the craft is put on its selected course, this adjustment may be made so that no signal is generated by the potentiometer P1. If the wind vane 30 changes its relative direction in response to a change in the direction of the apparent wind, the wiper of the potentiometer P1 will also turn normally causing a reversible electric signal to be generated and sent through a line 36, a resistor 37 and a line 38 to an amplifier 40. This amplifier in conjunction with a D.C. power line 42, will amplify any effective input signal to it and thus provide a reversible electric output current through a circuit 43 which runs an electric motor 45 in the direction called for by the input signal.

The motor 45 drives a worm 46 in the direction called for through a gear reducer 48. The worm 46 moves a worm nut 50 to the right or left as seen to turn a rudder 52 through a link 53, a tiller 54 and a rudder post or shaft 55 supported as in bearings 56 on a suitable platform or frame (not shown) at the stern of a craft to be steered.

A drogue 60 is towed astern of the craft on a line 62 attached to a lever arm 63 on a shaft 64 attached to the wiper (not shown) of a potentiometer P2. When the craft turns, the drogue 60 and the lever arm 63 turn the wiper of the potentiometer P2, a signal is generated and sent through the line 70, a resistor 71 and a line 72 to the amplifier 40.

The wind vane 30 and the drogue 60 will operate in conjunction with each other as above described in connection with the first embodiment so that the signal sent by the drogue 60 to the amplifier 40 will either oppose the signal sent by the wind vane 30 to the amplifier and thereby reduce or nullify it or else will be added to the wind vane signal so as to result in a stronger current to the motor 45 from the amplifier 40.

Another potentiometer P3 generates a signal to the amplifier 40 which acts as a rudder "follow-up" to null the amplifier output through the circuit 43 to the motor 45 and thereby to stop the rudder 52 at the angle ordered by the two input signals from the wind vane 30 and the drogue 60 and their respective potentiometers P1 and P2.

A shaft 76 turns the wiper (not shown) of the potentiometer P3 and is itself turned in response to the rotation of the worm 46 and the movement of the worm nut 50 to change the rudder angle. Any convenient gear reduction device which operates to turn the wiper of the potentiometer P3 from one extreme position to the other through the conventional two hundred and seventy degrees while the rudder is turned from one "hard over" position to the other may be used.

What is shown is a connection between the potentiometer shaft 76 and the shaft 77 of a pulley 78. This pulley 78 is driven by a belt 80 which runs over the pulley 78 and an idler pulley 81 and is connected as by a link 82 to the worm nut 50.

It will be understood that the circuitry for the potentiometers P1, P2 and P3, the amplifier 40 and the motor 45 together with their associated mechanism is schematic, that the power sources for the signals generated by the potentiometers are not shown, and that the balancing arrangements between the potentiometers including wheatstone bridges are not indicated because such arrangements between potentiometers and amplifiers as such are conventional. It will be further understood that the function of the potentiometers P1, P2 and P3 is such that when they are adjusted with respect to each other to establish an electrical balance, no input signal goes to the amplifier 40, no current flows to the motor 45, and no movement of the rudder 52 occurs, but that when either the wind vane 30 or the drogue 60 or both operates to turn one or both of its respective potentiometers, then an electrical imbalance is created providing a reversible input signal to the amplifier causing current to flow to the motor 45 thereby turning the rudder right or left as called for until the followup potentiometer P3 turns sufficiently to re-establish the electrical balance and stop the turning of the rudder 52. In other words when the three potentiometers P1, P2 and P3 are arranged in a circuit with each other in a conventional manner to control an amplifier, an electric imbalance is caused when one potentiometer is turned by a given angular amount until one or both of the other potentiometers are turned by an equivalent angular amount to reestablish the balance and stop the current flow.

The wipers of the potentiometers P2 and P3 are permanently adjusted at their mid-points when the drogue 60 and lever arm 63 are straight aft and the rudder is amidships respectively. All of the adjustment necessary to put the system in electrical balance or null can be made solely by the knob 32 on the potentiometer P1 with no resulting input signal into the amplifier from either the wind vane 30 or the drogue 60. Such adjustment will accomodate any rudder or drogue angle necessary or resulting when the craft is established on its predetermined course.

A third embodiment of the invention is shown in FIG. 5 in conjunction with the apparatus shown in FIG. 4 above described. In this alternative a rate gyro indicated at 90 is substituted for the drogue 60 as a turn sensor. The gyro responds to the rate of turn of the craft rather than the angular displacement of the turn as measured by the drogue 60 and thus becomes an effective damping device and stabilizer in the apparatus of the invention illustrated in FIG. 4.

The gyro rotor 91 is conventionally arranged and supported in a horizontal spring-centered single-degree-of-freedom gimbal ring 92 so as to spin at high speed under the action of driving means (not shown). When the craft is straight on course the gyro and its gimbal 92 remain level. Any turn of the craft will cause the gyro to process one way or the other depending upon the direction and velocity of the turn and will cause the wiper (not shown) of a potentiometer P4 to which it is connected by a shaft 93 to turn thus generating a signal to the amplifier 40 by way of a line 94 and a resistor 95 connected to the line 72 in FIG. 4 in place of the connection from the potentiometer P2 by way of the wire 70 and resistor 71.

Thus any commencement of a turn by the craft in either direction away from its pre-selected course will cause the gyro 90 to process and cause a signal to the amplifier 40 either resisting or aiding the signal from the wind vane 30 and causing damping of erratic course changes and stabilizing of the craft on its desired course.

It will be understood that the function of the resistors 37, 71, 76 and 95 is to help adjust the relative strengths of the input signals to the amplifier 40 so as to be able to adjust the amount of change in rudder angle in response to changes in the respective relative angles of the wind vane and of the drogue or rate gyro for optimum course keeping.

The second and third embodiments have the advantage of being electric power actuated in response to the wind vane and drogue or gyro functioning solely as signal producing and not actuating devices. Therefore the wind vane and the drogue can be smaller and located to best advantage for optimum functioning on the craft and without need to be in close proximity to each other.

As can be understood, other types of signal generators may be employed such as synchros for the second and third embodiments or their equivalents.

It will be seen that in the embodiment of FIGS. 1 to 3, a resistance to the turning of the rudder 8 is offered by the drogue 24 even when the latter is streaming straight aft. Such resistance is increased when the lever 22 turns to position 22B, and is increased even more if the craft turns to the right thus putting the drogue 24 into a position indicated by 24D.

Likewise, with respect to the electrically controlled embodiments shown in FIGS. 4 and 5, a continuing resistance effect is imparted to the rudder 52 even when the drogue 60 is streaming straight aft by reason of the fact that the signal level from the wind vane potentiometer P1 is alone only partially effective when not supplemented by a signal fron the drogue potentiometer P2 or the gyro potentiometer P4. That is, a fifteen degree change in the wind vane angle may impart a signal calling for a much smaller change in rudder angle unaided by a drogue or gyro signal. And if the craft starts to turn even slightly in a direction called for by a momentary wind change, the signal from the drogue or the gyro potentiometers P2 and P4 may nullify or even reverse the rudder angle signal from the wind vane. And the wind vane signal will have a strong effect to turn the rudder only when aided by a signal from the drogue potentiometer P2 in FIG. 4 or from the gyro potentiometer P4 in FIG. 5 which will result as when the craft is thrown off course by wave action.

The response of the drogue and also of the rate gyro to a deviation of the craft from its pre-selected course is temporary in that if the craft remains on the new course the drogue on the one hand, will straighten out astern of the craft, and the gyro, on the other hand, will stop precessing when the craft stops turning thus in each case terminating the response to the previous deviation of the craft from its course.

Furthermore, in each of the embodiments described herein, the damping means responds solely and directly to the turning or deviation of the craft in either direction from a preselected course, acts independently of the wind vane and is connected to act upon the rudder with a force which is separate from and additional to the force exerted on the rudder by the wind vane.

Thus, both the drogue and the rate gyro, used in either case as the damping means, are temporarily responsive to a deviation of the craft in either direction from its preselected course so as to act upon the rudder in such manner as to maintain the craft substantially on its pre-selected course without regard to whether the deviation is the result of an undesired turning of the rudder or a change of heading due to some other cause such as wave action or wind pressure on the sails.

It will be apparent to those skilled in the art of sailing fast trimarans and catamarans, that this invention substantially solves the problem in self steering for such craft which is the phenomenon called "multi-hull breakaway." This occurs when the craft falls off the wind, i.e., increases the angle between its course and the true wind, and accelerates enough to retain the original relative apparent wind angle with the result that the wind vane cannot sense that the craft has come onto a new and undesired course. The device of the invention prevents the craft from falling off the wind sufficiently for this to occur.

While the primary objective of the invention is to solve a steering problem of fast moving multi-hull sailboats, its embodiments can also be applied to power craft, i.e., to any sea-craft. While the expression "compass course" has been used herein to designate a "preselected course" to maintain which is the function of the steering device, it will be understood that "a preselected course" more broadly means the direction in which it is desired to go, which can be with reference to the apparent or true wind, to navigation marks such as buoys and lighthouses, to a magnetic or true (gyro) compass course, or with reference to a celestial body or other means of orientation.

What is claimed is:

1. A self steering device of the type which includes a wind vane responsive to the relative apparent wind and operable normally to exert a turning force in either direction to control a rudder for maintaining a sea craft on a pre-selected course, wherein the improvement comprises a damping means which is responsive to deviation of the craft in either direction from said pre-selected course independently of forces produced by the wind vane, said damping means being connected to act upon the said rudder with a turning force in either direction which is separate from and additional to the turning force exerted on the rudder by the wind vane, and in such a manner as to substantially reduce such deviation of the craft from said pre-selected course.

2. A self steering device according to claim 1 in which the damping means is also operable to damp rotation of the wind vane and rudder caused by temporary shifts in apparent wind direction.

3. A self steering device according to claim 1 which includes means to adjust the turning forces exerted by the wind vane and the damping means on the rudder independently of each other.

4. A self steering device according to claim 1 in which said damping means includes a drogue towed behind the craft.

5. A self steering device according to claim 4 in which said wind vane and said drogue are connected to the rudder by mechanical linkages.

6. A self steering device according to claim 5 in which the mechanical linkages are gears.

7. A self steering device according to claim 5 which includes means to adjust the force exerted by the wind vane on the rudder relative to the force exerted by the drogue on the rudder.

8. A self steering device according to claim 1 which includes means to disconnect the wind vane from the rudder to allow the wind vane to align itself with the apparent wind and then to connect the wind vane to the rudder when the craft is on a preselected course.

9. A self steering device according to claim 8 which includes remote control means to provide an adjustment between the relative rotative positions of the wind vane and the rudder.

10. A self steering device according to claim 1 which includes a first signal generator connected to the wind vane, a second signal generator connected to the damping means, an amplifier connected to the signal generators and a motor connected to the amplifier and arranged to operate the rudder in response to signals from the signal generators.

11. A self steering device according to claim 10 in which the damping means is a drogue.

12. A self steering device according to claim 10 in which the damping means is a rate gyroscope.

13. A self steering device according to claim 10 which includes a follow-up mechanism for the rudder.

14. A self steering device according to claim 10 which includes means to adjust the relative effects of the signal generators on the rudder.

15. A self steering device for maintaining a sea-craft on a pre-selected course relative to the apparent wind direction comprising a wind vane responsive to said apparent wind direction and operable normally to exert a controlling effect upon a rudder to steer the sea-craft, and a drogue operable to decrease the controlling effect of the wind vane on the rudder during temporary changes in apparent wind direction due to causes other than deviation of the sea-craft from its said pre-selected course and to increase the controlling effect of the wind vane on the rudder when the sea-craft deviates from its said pre-selected course.

* * * * *